June 18, 1968  H. R. FOSTER  3,388,982
GLASS POLISHING COMPOSITION CONTAINING AN INORGANIC BARIUM SALT
Filed Aug. 23, 1967

INVENTOR
HOMER R. FOSTER 3,388,982
GLASS POLISHING COMPOSITION CONTAINING AN INORGANIC BARIUM SALT
Homer R. Foster, Kittanning, Pa., assignor to Pittsburgh Plate Glass Company, Pittsburgh, Pa., a corporation of Pennsylvania
Continuation-in-part of application Ser. No. 520,542, Dec. 21, 1965. This application Aug. 23, 1967, Ser. No. 662,667
7 Claims. (Cl. 51—309)

ABSTRACT OF THE DISCLOSURE

A soluble barium salt, such as barium chloride, barium bromide, etc., is added to a glass polishing slurry containing soluble zirconium to be used in the presence of sulphate ions so as to react with the sulphate ions and substantially reduce any reaction between the zirconyl ions and the sulphate ions, insuring the presence of the zirconyl ions for glass polishing.

---

Figure 1:
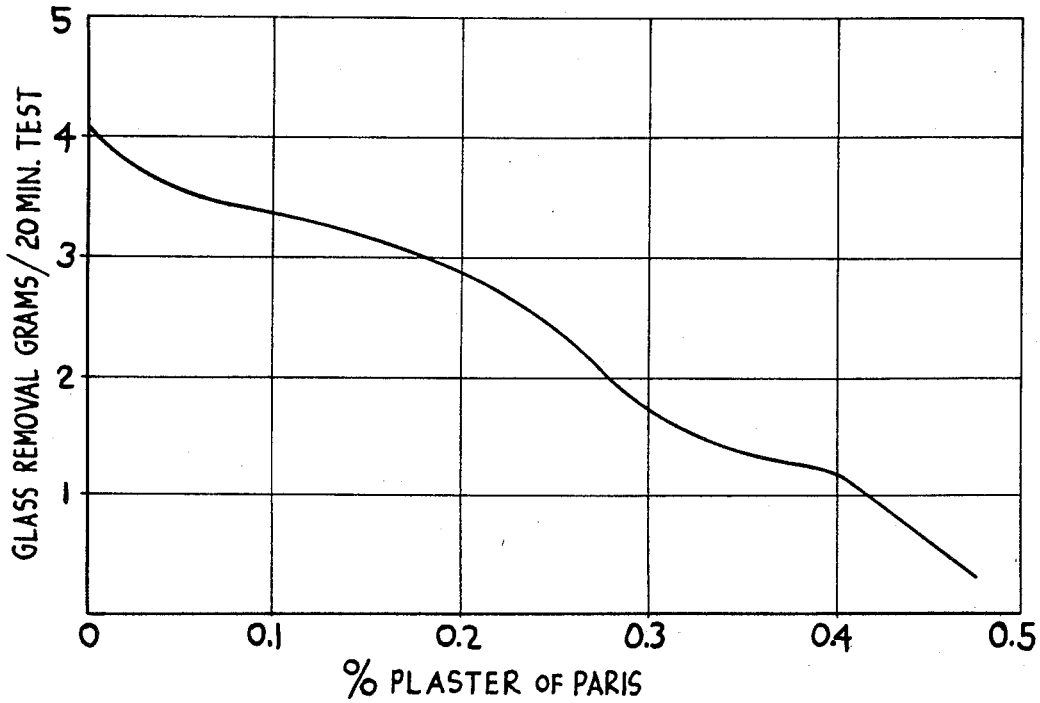

This application is a continuation-in-part of my copending application, Ser. No. 520,542, filed Dec. 21, 1965, entitled, "Glass Polishing Composition," and now abandoned.

The present invention relates to improvements in glass polishing. More particularly, the present invention relates to a new and improved glass polishing composition.

It is known in the art to polish glass with materials such as rouge, zirconium oxide and rare earth abrasives containing cerium oxide. One of the difficulties in using zirconium compounds is the expense of zirconium oxide as the abrasive material for a glass polishing composition, and thus there has been a serious economic problem where zirconium oxide has been considered.

In the copending application of John S. Sieger and Donald E. Cox, Ser. No. 403,980, filed Oct. 15, 1964, assigned to the assignee of the present application, entitled, "Glass Polishing Process and Composition," and now abandoned, and my copending application Ser. No. 515,306, filed Dec. 21, 1965, entitled, "Glass Polishing Composition and Method of Making Same," there are described glass polishing compositions which include zirconium oxide as an abrasive and "soluble zirconium," i.e., all the zirconium in the system excluding the zirconium oxide, the pH value of the compositions being adjusted to desired values.

In the first named application, a slurry is prepared by adding zirconyl nitrate, zirconium carbonate or zirconyl hydroxychloride to water such that the slury contains from 0.05 to 3.5 percent by weight dissolved zirconium, to which is added in solid form between 0.25 and 10 percent by weight of zirconium oxide ($ZrO_2$). The pH value of the composition is adjusted to a value between 1.5 and 4.5 by adding sodium hydroxide, sodium carbonate, nitric acid or hydrochloric acid depending upon the initial pH value of the solution.

In my copending application, a polishing composition is prepared by dissolving zirconium tetrachloride ($ZrCl_4$) in water to produce a solution containing between 0.05 and 3.5 percent by weight dissolved zirconium. The pH value of the solution is adjusted to a value of between 1.5 and 3.0 by the addition of lime (calcium hydroxide), after which zirconium oxide in solid form is added to produce a composition containing between 0.25 and 10 percent by weight of zirconium oxide.

On a test machine having a turnable 19 inches in diameter rotating at 300 r.p.m. and a 10-inch diameter polishing block with a one inch thick cattle hair felt pad of 0.025 pound per cubic inch density and a polishing pressure of one pound per square inch with any polishing composition above described dripped onto the surface of a circular glass sample 19 inches in diameter just outside the polishing pad at a rate of 50 cubic centimeters per minute, there was removal rate on the order of 4.5 grams per 20-minute test. Using a rouge and copperas water conventional polishing composition, i.e., a 7.0° Baumé solution, having a pH value of 3.3, a removal rate of 2.4 grams per 20-minute test was obtained. When zirconium oxide and soluble zirconium solutions are used on commercial polishing lines wherein the glass is adhered to polishing tables by nylon cloth, equally good results are obtained. However, poor results are obtained on commercial polishing lines wherein the glass is adhered to polishing tables by plaster of Paris and there is exposed plaster of Paris at locations along the edges of the plates, between adjacent plates, and at damaged portions of the plates or where rouge is present as a residue or in the polishing pads.

It has been found that excellent results are obtained using the aforementioned polishing compositions containing zirconium oxide and soluble zirconium on commericial polishing lines where plaster of Paris is used as above described and/or there is a residue of rouge or rouge is present in the polishing pads. This is accomplished by adding a finite amount, i.e., on the order of as little as one percent or less by weight of the polishing composition, of a soluble barium compound to the polishing composition. Examples of soluble barium compounds which enhance the polishing solution are barium chloride ($BaCl_2$), barium bromide ($BaBr_2$), barium iodide ($BaI_2$), and barium nitrate ($Ba[NO_3]_2$) and mixtures thereof. Barium carbonate ($BaCo_3$), for example, produces carbonate ions which react with the soluble zirconium and lowers the polishing efficiency of the polishing slurry. It is preferable to choose a barium compound which, when dissolved, does not release an anion that reacts with the soluble zirconium. The particular quantity of the barium compound depends upon the amount of plaster of Paris or rouge present and must be determined on the basis of the actual amounts encountered. In any event, the quantity of the barium compound is measurable.

In the absence of the soluble barium salt, the sulphate ion in the rouge slurry (ferrous sulphate being used as an additive for rouge) and in the plaster (plaster being calcium sulphate with some potassium sulphate as an additive) reacts with the soluble zirconium salt in the polishing compound and forms a soluble complex ion (probably $ZrO(SO_4)_2^-$). Soluble zirconium is thus effectively removed from the polishing slurry and the zirconyl ion is not available for the polishing reaction. The soluble barium salt, $BaCl_2$, etc., reacts with the sulphate ion and protects the soluble zirconium salt.

One method of preparing the polishing composition thus described is to follow the teachings of my copending application, i.e, dissolve a quantity of zirconium tetrachloride in water, so as to produce a solution containing from 0.05 to 3.5 percent by weight dissolved zirconium, adjusting the pH value of the solution to a value between 1.5 and 3.0, adding zirconium oxide in solid form as the abrasive, in an amount of 0.25 to 10 percent by weight, and then adding a finite quantity of the soluble barium salt, generally one percent by weight of the composition or more. However, as previously stated, the quantity of the soluble barium salt may be less than one percent depending upon the conditions encountered.

The soluble barium salt may be added to the water prior to the addition of the zirconium tetrachloride thereto or at any other time in the preparation of the solution.

Figure 2:
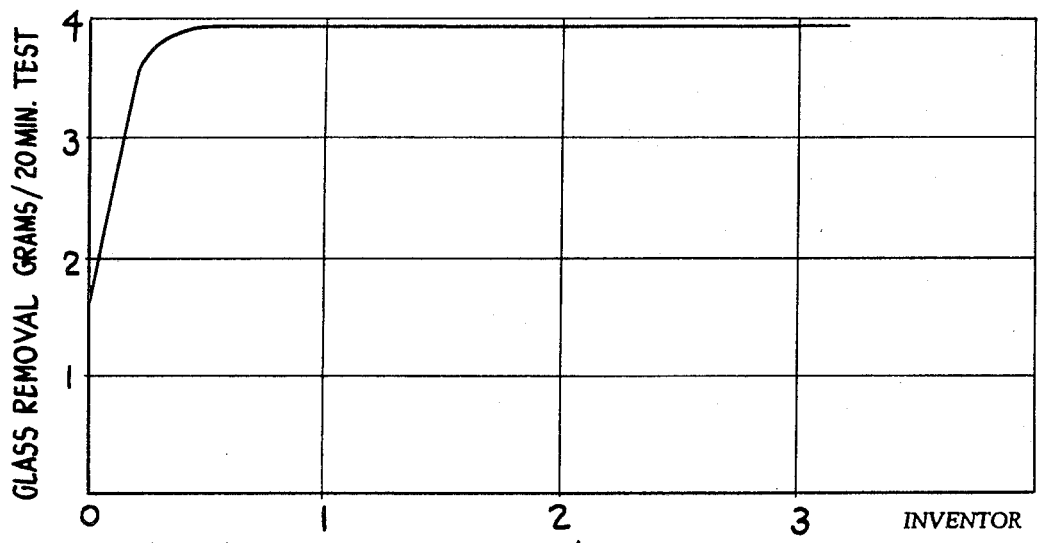

To further describe this invention, attention is directed to the accompanying drawing in which:

FIG. 1 is a curve illustrating the effect of plaster of Paris on glass removal measured in grams per 20-minute test using a 3 percent zirconium oxide solution containing soluble zirconium, and FIG. 2 is a curve illustrating the effect on glass removal measured in grams per 20-minute test effect when barium chloride is added to a 3 percent zirconium oxide solution containing soluble zirconium and also 0.3 percent plaster of Paris.

From the curve of FIG. 1, it will be appreciated that when the quantity of plaster of Paris increases, glass removal decreases using zirconium oxide solutions containing soluble zirconium in the absence of barium chloride.

The curve of FIG. 2 demonstrates that removal increases rapidly to a maximum value when plaster of Paris is present when a small, finite and measurable amount of barium chloride is added to the zirconium polishing solution.

To further evaluate the invention, comparison of the following results with those in the specific examples can be made.

In a conventional plate glass polishing line in which rough-rolled glass is ground and polished and there are 30 runners, each including twelve 27-inch hair felt polishing pads operating on a ribbon approximately 131 inches wide at a ribbon speed of 250 inches per minute, and using a 2.3° Baumé rouge-copperas water polishing slurry fed to the runners, there is a glass removal of 180 to 200 microinches to produce glazing quality glass. In such line, plaster of Paris is used to adhere the glass to tables for polishing and is also used at the edges, between plates and to repair broken plates.

A 3 percent zirconium oxide polishing slurry which included soluble zirconium was substituted for the rouge-copperas water polishing slurry described above at the first 6 runners, so that 24 runners operated with the rouge-copperas water slurry. The glass removal was measured to be 150 to 170 microinches and the glass was reject quality. As the number of runners to which the zirconium slurry was fed increased, the glass quality decreased.

EXAMPLE I

A small quantity, i.e., approximately 1 percent by weight of barium chloride, was added to the slurry containing 3 percent zirconium oxide and soluble zirconium. With 15 of the 30 runners operating and the solution fed to all operating runners, the removal was measured to be 200 or more microinches and the quality was as good as or better than that produced using the described rouge-copperas water polishing slurry fed to the 30 runners.

EXAMPLE II

When a zirconium-barium chloride polishing slurry similar to that described in Example I was used on the first 6 runners and the rouge-copperas water polishing slurry was fed to the remaining 24 runners, the glass removal was measured to be above 200 microinches and the finish was good.

EXAMPLE III

Barium bromide is substituted for the barium chloride of Example I. The results are the same.

I claim:
1. A glass polishing composition comprising an aqueous slurry containing from 0.05 to 3.5 percent by weight dissolved zirconium, having dispersed therein in solid form between 0.25 and 10 percent by weight of zirconium oxide and a finite measurable quantity of less than approximately 1 percent by weight of a soluble inorganic barium salt, said glass polishing composition having a pH in the range of 1.5 to 3.0.

2. A method of polishing glass comprising,
   adhering said glass to a support with plaster of Paris, and
   subjecting a surface thereof to polishing action of a polishing surface having interposed between the glass surface and the polishing surface an aqueous slurry containing dissolved zirconium, and zirconium oxide abrasive dispersed therein and a finite measurable quantity of less than approximately 1 percent by weight of a soluble inorganic barium salt, the pH of the slurry being maintained at between 1.5 and 3.0.

3. A glass polishing composition as recited in claim 1 containing a soluble barium salt selected from the group consisting of barium chloride, barium bromide, barium iodide, barium nitrate, and mixtures thereof.

4. A glass polishing composition as recited in claim 3 containing approximately one percent barium chloride.

5. The method of claim 2 wherein the slurry contains said dissolved zirconium in an amount of between 0.05 and 3.5 percent by weight.

6. The method of claim 2 wherein the slurry contains zirconium oxide in an amount of from 0.25 to 10 percent by weight.

7. The method of claim 2 wherein the slurry contains approximately one percent by weight of a soluble barium salt selected from the group consisting of barium chloride, barium bromide, barium iodide, barium nitrate, and mixtures thereof.

References Cited

UNITED STATES PATENTS

| | | | |
|---|---|---|---|
| 2,955,031 | 10/1960 | Bliton et al. | 51—309 |
| 2,996,369 | 8/1961 | Harris et al. | 51—309 |
| 3,071,455 | 1/1963 | Harman et al. | 51—308 |
| 3,097,083 | 7/1963 | Silvernail | 51—307 |
| 3,123,452 | 3/1964 | Harris et al. | 51—309 |
| 3,131,039 | 4/1964 | Nonamaker | 51—309 |
| 3,254,949 | 6/1966 | Clearfield | 51—309 |

DONALD J. ARNOLD, *Primary Examiner.*